Figure 1:
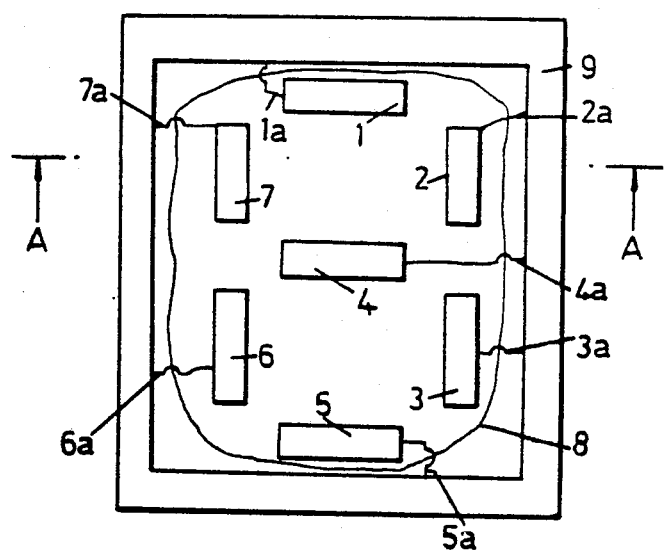

United States Patent [19]

Korinek

[11] 4,073,570
[45] Feb. 14, 1978

[54] ELECTROCHROMIC DISPLAY DEVICE

[75] Inventor: Karel Anthony Korinek, Runcorn, England

[73] Assignee: Imperial Chemical Industries Limited, London, England

[21] Appl. No.: 667,216

[22] Filed: Mar. 15, 1976

[30] Foreign Application Priority Data

Mar. 13, 1975 United Kingdom ............... 10454/75

[51] Int. Cl.² .............................................. G02F 1/36
[52] U.S. Cl. .................. 350/357; 340/324 R
[58] Field of Search ...................... 350/161 R; 340/324

[56] References Cited

FOREIGN PATENT DOCUMENTS 2,412,535   9/1974   Germany ..................... 350/160 R Primary Examiner—William L. Sikes
Attorney, Agent, or Firm—Cushman, Darby & Cushman

[57] ABSTRACT

An electrochromic device in which the electrochromic medium contains a low concentration of an auxiliary redox system and a relatively large concentration of an inert electrolyte.

10 Claims, 2 Drawing Figures

ELECTROCHROMIC DISPLAY DEVICE

This invention relates to electrochemical devices.

Electrochemical devices, and particularly display devices based on electrochemical phenomena are known which comprise a working electrode having radiation transmission or reflection properties; an organic active material the oxidation state of which may be reversibly changed by passage of an electric current through it resulting in a detectable change in the appearance of the working electrode; and a counter electrode also in contact with the active material. For display purposes the radiation will usually be visible radiation, and the counter electrode will be so disposed with respect to the working electrode that changes occurring at the working electrode are not obscured from an observer thereof by reactions occurring at the counter electrode. The said electrodes and active material will be contained within a suitable housing comprising means, for example a transparent window, through which the working electrode may be observed.

Such devices have been described for example in British Pat. No. 1,314,049 (equivalent to U.S. Pat. No. 3,712,709) in British Pat. No. 1,302,000 and in U.S. Pat. No. 3,806,229.

The electrochromically active materials in such devices are capable of accepting or donating electrons and being thereby converted into radical ions which have a high extinction value, usually in the visible part of the spectrum. In general the materials as such have in one oxidation state no, or hardly any, colour, so that even by the passage of a small current at appropriate EMF high contrast images may be obtained, and for the purposes of the invention such materials are preferred.

The presence of an auxiliary redox system in the form of the system $Fe^{++} \rightleftarrows Fe^{+++}$ is advantageous in electrochromic devices involving materials as disclosed above, and in our copending British Patent Application No. 12904/73 we describe the use of ferrous ammonium sulphate as a particularly preferred additive whereby the said redox system may be incorporated into the electrochromic medium, (by electrochromic medium we mean a composition comprising the electrochromically active material; it may be liquid or solid or semi-solid, and will usually comprise essentially the electrochromically active material, together with an appropriate inert solvent therefor, and other components as may be desirable).

In our copending British Patent Application No. 11597/74 we describe a modification of an $Fe^{++} \rightleftarrows Fe^{+++}$ containing system in which there is included a complexing agent for metal ions, preferred agents being hydroxy carboxylic acids e.g. tartaric, succinic and malonic acids.

We have now found that the need for the presence of a complexing agent in an electrochromic medium comprising an auxiliary redox system may be obviated or reduced by reducing the concentration of the auxiliary redox system component to a very low level and incorporating into the medium an inert electrolyte in a quantity sufficient to raise the electrical conductivity of the medium at least to that of an equivalent medium containing as electrolyte only the electro chromic active material and ferrous ammonium sulphate in at least 0.1 M, preferably 0.3 and more preferably 0.4 M concentration. Water is the preferred solvent.

Electrochromic devices comprising an electrochromic medium according to the invention show better memory characteristics than devices in which the medium comprises a low concentration of the auxiliary redox system without the relatively large concentration of inert electrolyte.

Photodegradation, which sometimes occurs in electrochromic systems, particularly in the presence of high U.V. content illumination, may also be reduced by the present invention, although the use of U.V. absorbant materials, either as a component of the medium or as a component of the housing (e.g. the transparent wall of the housing) may be desirable.

Figure 2:
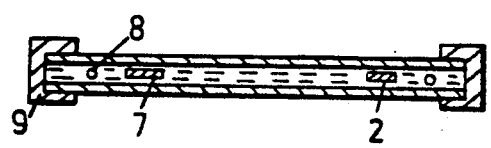

Reference is made to the drawing herein wherein FIG. 1 is a plan view of the device and FIG. 2 is a section along the line A—A of FIG. 1. FIG. 1 illustrates a plurality of working electrodes (1 to 7), each with its own lead (1a to 7a) disposed in a pattern capable of representing any numeral from 0 to 9 by selective deposition upon a preselected group of electrodes. A counter electrode (8) is represented by a wire, disposed about to perimeter of the device (9).

Accordingly the present invention provides an electrochromic device comprising a working electrode having radiation reflection or transmission properties; a counter electrode; and an electrochromic medium in electrical contact with the working and counter electrodes, said medium comprising an electrochromically active material, an auxiliary redox system in very low concentration and an inert electrolyte in concentration sufficient to raise the electrical conductivity of the medium to that of an equivalent medium containing ferrous ammonium sulphate in at least 0.1 M concentration.

The electrodes may be single or multiple (i.e. the device may comprise more than one working and/or counter electrodes), they may be transparent, translucent or opaque and they may be of the same or different materials. The electrodes may be of a noble metal, e.g. of Group VIII metals or, preferably, gold; of non-conducting material, e.g. glass, plastics or ceramic material carrying a layer usually very thin, of the order of 50A-1μ of electrically conducting material which will usually be a metal; or of an electrically conducting non-metal, e.g. glass coated with indium or tin oxide. Platinum and, particularly, gold are preferred electrode materials, particularly in the form of a thin, (100A to 500A) transparent deposit upon a suitable insulating carrier, e.g. ceramic material or glass.

Where the device comprises a plurality of working electrodes each of the working electrodes may be provided with a separate counter electrode, although this is not essential, since a single counter electrode, for example in the form of a wire or gauze around the periphery of the device comprising a plurality of the electrodes, may be quite satisfactory. Alternative arrangements include a counter electrode, conveniently transparent deposited upon a wall of the housing, or on the reverse side of the working electrode substrate, where employed. Enhanced speed or response to passage of a current is given when the surface area of the counter electrode is greater than that of the working electrode.

The active electrochromic material is an organic compound which is a bicyclic compound having two nitrogen containing rings. Particularly preferred are N-substituted derivatives of such compounds. Typical of these compounds are those disclosed in U.S. Pat. No. 3,712,709 in which the active material is a simple salt or a polymeric form of a mono or di-N-substituted-p-cyanophenyl of a bipyridyl, diazapyrene or biquinolyl.

Similar compounds are disclosed in U.S. Pat. No. 3,806,229, in which compounds having the formula

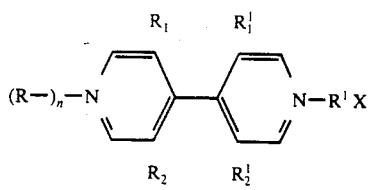

are employed as electrochromic materials. In these compounds R and $R^1$ each represent an alkyl or cycloalkyl group containing up to 18 carbon atoms or an unsaturated alkyl or cycloalkyl group containing up to 12 carbon atoms or an aralkyl or alkaryl group containing up to 10 carbon atoms or a phenyl group, which groups may be substituted in the aromatic nucleus with $CF_3$, a halogen, $CH_3$, $OCH_3$ or $NO_2$, a carbonamido-alkyl group in which the nitrogen atom may carry one or two alkyl groups which together with a hetero-atom may form a ring which group may contain up to 10 carbon atoms, an alkoxy carbonylalkyl group containing up to 16 carbon atoms or a nitrile group.

Further examples of electrochromic compounds are the polymeric dipyridilium compounds described in U.S. Pat. No. 3,641,034.

The preferred compound for use in devices according to the invention is N,N'-di(p-cyanophenyl) 4,4'-bipyridilium dichloride and sulphate. Upon reduction of the salt deposition of the insoluble coloured radical cation species occurs over the plane surface of the working electrode. As the radical cation is insoluble it does not diffuse away from the electrode surface, and is easily reoxidised to the colourless form by reversal of the applied potential. The N-(p-cyanophenyl) radical species is coloured, usually green, while the parent is usually colourless or pale yellow.

The active material is usually used in aqueous medium, e.g. water, which optionally may contain a compatible water-soluble polymer such as agar, gelatine, methyl cellulose, polyvinyl alcohol or polyvinyl-pyrrolidone, where such additional component is not disadvantageous.

Examples of anions which may be associated with the active materials are halides, especially chloride, $SO_4^=$, $HSO_4^-$, $RSO_4^-$ (where R is an alkyl group) $SiF_6^=$ or $BF_4^-$.

The concentration of the active material may be typically as described in the patents referred to, that is, of the order of .001 M, but there may be some advantage in increasing it somewhat, so that our preferred concentration of the active material is between about 0.0002 and 0.05 M more preferably from 0.001 to 0.03 M, and particularly 0.01 to 0.02 M.

Reduction and deposition of the active material is conveniently effected by applying an EMF of the order of 0.8 to 1.25 v for 100 milli-seconds. However the operation of electrochromic devices is discussed thoroughly in the aforementioned patents.

In some circumstances it may be desirable to employ a small 'holding voltage' of the order of 0.2 to 0.4 v to maintain a display.

The low concentration auxiliary redox system is preferably a metallic-ion based system and the suitability in any particular case may be determined by simple experiment. The preferred system is $Fe^{++} \rightleftarrows Fe^{+++}$, although other suitable systems e.g. vanadyl and titanous are not excluded. The concentration of the redox system is preferably within the range $1 \times 10^{-5}$ to $5 \times 10^{-2}$ M and more preferably within the range $1 \times 10^{-3}$ to $1 \times 10^{-2}$ M.

The metal salt of the auxiliary redox system may be incorporated in any convenient form, although it is important that any ions introduced with the metal are compatible with the system. The suitability of any particular compound for this purpose may be determined quite easily by simple trial. We prefer to add iron in the form of ferrous ammonium sulphate, although ferrous sulphate may be employed, as well as ferrous ethylene diammonium sulphate, for example. Impurities are preferably kept to a minimum, since they tend to affect the operation of the device adversely. Ferric ion is preferably absent from the system and where possible ferric ion-free materials should be employed.

The use of acid conditions, usually pH 1 to 6 preferably about pH 1 to 4 and more preferably pH 2.5 to 3, may be advantageous. Such conditions may be attained by the presence of an appropriate quantity of an acid, conveniently sulphuric or hydrochloric acid (powerful oxidising acids e.g. $HNO_3$ should obviously be avoided) although an organic acid for example tartaric acid may be suitable.

The inert electrolyte should not adversely affect the operation of the device; it is important, for example that it does not react undesirably with any of the other components of the device and it should not destroy the activity either of the active electrochromic material or the effectiveness of the auxiliary redox system. The suitability of any electrolyte for a given purpose may be determined by simple trial. Obviously, also, the inert electrolyte will itself be colourless in solution in the electrochromic medium, or if coloured, will not be undesirably so, and will have solubility and dissociation characteristics under the conditions of operation of the device such that it provides the required conductivity.

The inert electrolyte is preferably an inorganic metal salt. although compounds of non-metals are not excluded.

The concentration of the inert electrolyte will conveniently be from 0.1 M to saturation, preferably from 0.3 M to 0.5 M and more preferably 0.4 M.

Examples of inert electrolyte materials are ammonium, quaternary ammonium and alkali and alkaline earth metal salts e.g. lithium potassium, sodium and magnesium. Typical anions include $SO_4^{--}$, $HSO_4^-$, and $RSO_4^-$ (where R is an alkyl group, particularly a $C_{1-4}$ alkyl). The electrolyte must not be discharged at a voltage, the same or less than that required for electrochromic display.

It is most desirable to exclude molecular oxygen from within the device (e.g. dissolved in the liquid medium) since for example when iron is used in the auxiliary redox system oxygen may promote the formation of hydrated oxides of iron, although this is much less likely than when much higher concentrations of iron are used.

The presence in the medium of a suitable complexing agent for the metal ion of the auxiliary redox system may be useful in that it reduces the likelihood of deposition of insoluble iron compounds.

The complexing agent employed will, of course, be compatible with the other components of the device; it will be appropriately soluble in the electrochromic medium, and it will be capable of forming a complex with metal ions in the medium to prevent their permanent precipitation.

Selection of a suitable complexing agent will be on the basis of known chemical characteristics and suitability of any particular agent for application in a given environment is easily determined by simple trial. Essentially the complex formed with the metal ion should be colourless or substantially so (unless the formation of a colour with the complexed metal ion is employed as part of the display, or is not visible within the display area) and should be soluble so that the complexed ion remains available in solution for reduction to the reduced form.

The concentration of the complexing agent will usually be from $1 \times 10^{-5}$ M to $2.5 \times 10^{-1}$ M and preferably between $1 \times 10^{-3}$ M and $1 \times 10^{-2}$ M; i.e. we usually prefer to employ a molar concentration of the complexing agent of the same order as that of the metal of the auxiliary redox system, and preferably will be from 0.5 to 3 times the molar concentration of the metal ion. Care will, of course, be taken that the concentration of the complexing agent, as with all solutes, in such that undesirable deposition of solid does not occur at the temperatures at which the device may be required to function. The agent should also, of course, be soluble in the electrochromic medium to the extent required.

The complexing agent is preferably an organic compound capable of complexing with the metal ion to form a 4 to 7 membered chelate ring. Examples of such compounds include saturated compounds (cyclic or acyclic) containing carboxyl, and preferably hydroxy groups appropriately located within the molecule. Preferred are saturated mono- and di-hydroxy carboxylic acids, particularly $\alpha$ and $\beta$-OH carboxylic acids. Examples of such compounds include formic, acetic, citric, tartaric, succinic, malic, malonic, cyclopropane 1,2 dicarboxylic, and cyclopropane 1-OH, 2-carboxylic acids. Tartaric acid is the preferred acid, the $D^{(+)}$ form being most suitable by virtue of its solubility, as also is the meso form. An acid complexing agent may also impart the desired acidity to the medium as discussed above.

Acids which precipitate the metal at the concentrations used, for example oxalic acid with iron, are obviously unsuitable.

EXAMPLE 1

A device according to the invention was prepared as follows. Seven working electrodes and the leads thereto were deposited in the conventional digit pattern upon a glass plate 1 inch square and ⅛ inch thick. The metal deposit forming the electrode was about 1000 A thick. The plate was located within a cell 1/10 inch deep, around the periphery of the plate was positioned a counter electrode in the form of a spiral wire and the cell was completed by a transparent cover through which the pattern of the working electrodes was visible. Electrical connection to the electrodes were made as appropriate so that current could be passed to all or some of them as required.

The electrochromic medium contained N,N'-di(p-cyanophenyl) 4,4'-bipyridilium (CPQ) dichloride in aqueous solution at a concentration of 0.01 M. The solution also contained ferrous ammonium sulphate in 0.01 M concentration, and lithium sulphate in 0.4 M concentration. The medium contained 0.25 M $D^{(+)}$ tartaric acid.

A potential of 0.8 v was employed to operate the device, which was cycled at 22° C (by reversing the polarity of the working and counter electrodes).

EXAMPLE 2

Electrochromic compositions were made as follows:
0.01 M CPQ chloride
0.25 M tartaric acid
1.00 M sodium sulphate and varying concentrations of $Fe^{++}$ as ferrous ammonium sulphate indicated in the Table below.

To each solution was added $10^{-4}$ M $Fe^{+++}$ as ferric ammonium sulphate to simulate the effect of ageing or exposure to atmosphere on the composition.

A charge of 1 millicoulomb/sq cm was passed through each solution and the time for the resulting deposit to self-bleach was measured.

Results are set out below:

Table

| Molar Conc of $Fe^{++}$ | Time to self-bleach |
| --- | --- |
| $1 \times 10^{-4}$ | 5 minutes |
| $1 \times 10^{-3}$ | 5 minutes |
| $1 \times 10^{-2}$ | 4 minutes |
| $5 \times 10^{-2}$ | 3 minutes |
| $1 \times 10^{-1}$ | 1.5 minutes |
| $5 \times 10^{-1}$ | 20 seconds |

EXAMPLE 3

A display device was prepared by depositing seven gold working electrodes, each about 1000 A thick, and their leads in digital layout upon a glass plate. A counter electrode, also of gold, was deposited around the periphery of the plate and spaced apart from the working electrodes and leads. A convex glass cover sealed to the plate edges completed the cell assembly. The device was filled with an electrochromic solution containing N,N diheptyl 4,4'-bipyridilium dibromide (0.01 M), lithium sulphate (1 M) and sulphuric acid (0.05 M) and ferrous ammonium sulphate (0.05 M) in distilled water. The device was operated using a colour voltage of 3.4 v and bleach voltage of 3.1 v. Colour time was 0.6 sec. and bleach time 0.7 sec. The device was driven through a 5600 Ω resistor.

EXAMPLE 4

An electrochromic solution had the following composition (concentrations in moles/litre of solution in distilled water:-

| | |
| --- | --- |
| CPQ sulphate | 0.02 M |
| ferrous ammonium sulphate | 0.05 M |
| tetraethyl ammonium sulphate | 0.5 M |
| sulphuric acid (to pH 2.6) | |

This solution operated successfully in a device prepared by leaching a digital electrode display and counter electrodes and leads from a tin oxide transparent electrode plate covered, to complete the cell, by a transparent conductive convex sheet sealed to the periphery of the plate.

EXAMPLE 5

An electrochromic solution was prepared having the following composition (concentrations in moles/litre of solution in distilled water).

| | |
|---|---|
| CPQ chloride | 0.02 M |
| Fe Cl$_2$ | 0.05 M |
| Ca Cl$_2$ | 0.5 M |
| 0.01 M | HCl |

EXAMPLE 6

An electrochromic solution was prepared having the following composition (concentrations in moles/litre of solution in distilled water).

| | |
|---|---|
| CPQ sulphate | 0.02 M |
| Lithium sulphate | 1 M |
| Ferrous ammonium sulphate | 0.05 M |
| H$_2$SO$_4$ to pH 2.7 | |

EXAMPLE 7

An electrochromic solution was prepared having the following composition (concentrations in moles/litre of solution in distilled water).

| | |
|---|---|
| CPQ sulphate | 0.02 M |
| Ammonium sulphate | 1 M |
| Ferrous ammonium sulphate | 0.05 M |
| H$_2$SO$_4$ to pH 2.7 | |

What we claimed is:

1. An electrochromic device comprising a working electrode having radiation reflection or transmission properties, a counter electrode, and an electrochromic medium contacting the working and counter electrodes, the medium comprising an electrochromically active material, an auxiliary redox system present in a concentration from $1 \times 10^{-5}$ to $5 \times 10^{-2}$ M and an inert electrolyte.

2. A device according to claim 1 in which the concentration of the inert electrolyte is sufficient to raise the electrical conductivity of the medium to that of an equivalent medium containing ferrous ammonium sulphate in 0.1 M concentration.

3. A device according to claim 1 in which the electrochromically active material is an N-substituted derivative of an organic compound having at least two nitrogen containing rings.

4. A device according to claim 1 in which the concentration of the auxiliary redox system is within the range $1 \times 10^{-3}$ to $1 \times 10^{-2}$ M.

5. A device according to claim 1 in which the auxiliary redox system is $Fe^{++} \rightleftarrows Fe^{+++}$.

6. A device according to claim 5 in which the electrochromic medium contains ferrous ammonium sulphate.

7. A device according to claim 1 in which the inert electrolyte is present in a concentration with the range 0.1 M to saturation.

8. A device according to claim 1 in which the electrochromic medium contains a complexing agent for the metal ion of the auxiliary redox system.

9. A device according to claim 8 in which the complexing agent is a saturated hydroxy carboxylic acid.

10. An electrochromic medium comprising an electrochromically active material, an auxiliary redox system present in a concentration from $1 \times 10^{-5}$ to $5 \times 10^{-2}$ M and an inert electrolyte in concentration sufficient to raise the electrical conductivity of the medium to that of an equivalent medium containing ferrous ammonium sulphate in 0.1 M concentration.

* * * * *